A. H. REVELL & T. P. MURRAY.
FIRELESS COOKING APPARATUS.
APPLICATION FILED AUG. 26, 1910.
1,043,360.
Patented Nov. 5, 1912.
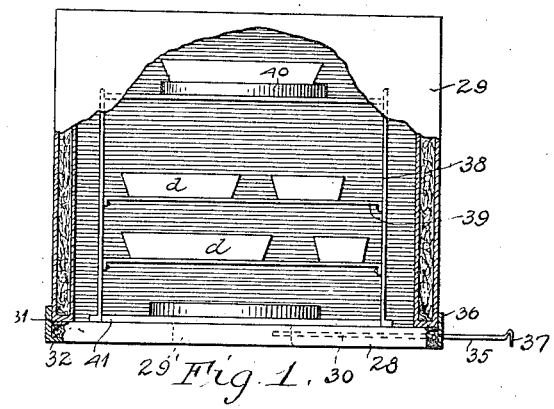
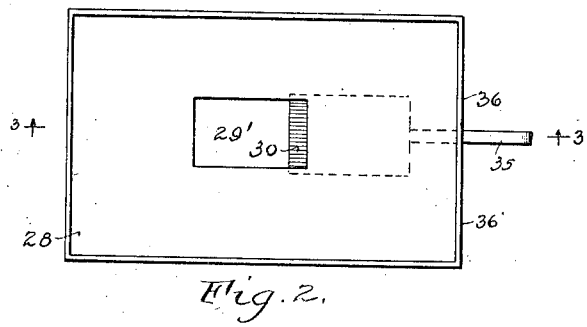
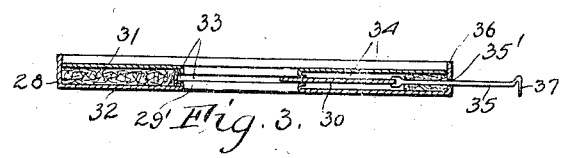

UNITED STATES PATENT OFFICE.

ALEXANDER H. REVELL AND THOMAS P. MURRAY, OF CHICAGO, ILLINOIS; SAID MURRAY ASSIGNOR TO SAID REVELL.

FIRELESS-COOKING APPARATUS.

1,043,360.  Specification of Letters Patent.  Patented Nov. 5, 1912.

Application filed August 26, 1910.  Serial No. 579,041.

*To all whom it may concern:*

Be it known that we, ALEXANDER H. REVELL and THOMAS P. MURRAY, both residing at Chicago, in the county of Cook and State of Illinois, have invented certain new and useful Improvements in Fireless-Cooking Apparatus, of which the following is a true, clear, and precise specification.

Our invention relates to fireless cooking apparatus and contemplates various features and improvements in construction, operation and control.

Our invention will be more clearly understood from the following specification and by reference to the accompanying drawings, in which drawings—

Figure 1 is a front elevational view of an oven partly in section to show the interior arrangement. Fig. 2 is a plan view of the tray member shown in Fig. 1, and Fig. 3 is a sectional view taken on plane 3—3, Fig. 2.

In the form of stove shown, the floor is in the form of a tray 28 adapted to receive a removable hood 29 above the tray, the hood being constructed of inner and outer walls to be highly non-conductive to heat. The tray has also an inlet opening 29' provided therein and controlled by a plate 30, this plate being preferably arranged between the inner and outer walls 31 and 32 of the tray and slidable in grooves 33 formed by deflecting inwardly the edges of the walls 31 and 32 about the inlet opening and about the passageway 34 formed adjacent the inlet for receiving the plate 30 when slid outwardly to open the inlet. The plate has a bar 35 extending therefrom to the exterior through opening 35' in the side wall 36 of the tray, the end of the bar being bent at 37 so as to be easily manipulated by the hand to be slid inwardly and outwardly to close or open the inlet 29'. The side walls 36 extend a distance above the inner wall 31 of the tray to form a guard for retaining the hood 29 in proper position on the tray. For supporting the various cooking utensils within the hood we provide a rack frame 38 adapted to support grid frames 39 in various horizontal positions to receive the various cooking utensils *d*.

In operation the grid frames 39 are adjusted on the rack frame and the various utensils set thereon, as desired. One or more heat radiators 40 may also be laid on the tray either directly or on a suitable grid 41, and particularly for baking, one or more of these radiators may be applied at the top of the rack frame, as shown. The hood is then applied, and a burner over which the tray has been placed is lighted and the bar 35 drawn outwardly to open the inlet 29' to allow the heat from the burner to enter and to give a preliminary heating to the hood and tray and to the various members within the hood, and after sufficient heat has been charged the burner is extinguished and the bar 35 is pushed inwardly to carry the plate 30 over the inlet to entirely close the receptacle, whereafter the accumulated heat will be effective in finishing the cooking or baking process.

Fireless cookers have heretofore been constructed more for ordinary cooking purposes than for baking purposes and have also been more or less clumsy to handle and to manipulate. As above stated, their efficiency is also far from maximum on account of loss of heat during transportation of the separately heated radiators and cooking utensils and the great absorption of heat by the cold receptacle into which the radiators and utensils were subsequently placed, these receptacles being usually only open at the top so that the utensils have to be let down into them. Our improved form has more of the features of the ordinary stove or oven and is as adaptable for baking as it is for ordinary cooking. The device can be set on a stove, or within the oven thereof. As the utensils with the material therein and the radiators can be handled when cold and inserted in the oven to be there during the initial heating period, much walking and carrying of hot parts by the operator is eliminated. Our device is also entirely sanitary and fire-proof.

As changes and modifications can readily be made without departing from the scope of our invention, we do not desire to be limited to the precise forms and arrangements which we have shown and described, and we therefore claim the following:

In a fireless cooking apparatus, the combination of double metallic sheet metal walls forming a receptacle, the space between said walls being filled in with non-conductive material, the sheet metal walls of the floor of said receptacle being cut away to leave an inlet opening, and the sections of the metal adjacent said inlet opening being deflected into said opening and bent to form opposed slideways, and a plate controllable from the exterior of the receptacle for engaging in said slideways to open or close said inlet, said inlet being adapted for association with a suitable burner for admitting heat into the interior of the receptacle.

In witness whereof, we hereunto subscribe our names this 22d day of August, A. D. 1910.

ALEXANDER H. REVELL.
  THOMAS P. MURRAY.

Witnesses:
 JOHN A. THOMPSON,
 CHARLES J. SCHMIDT.